(12) United States Patent
Chen

(10) Patent No.: US 11,890,550 B2
(45) Date of Patent: Feb. 6, 2024

(54) ELECTRICAL TOMOGRAPHY-BASED OBJECT RECOGNITION

(71) Applicant: Mattel, Inc., El Segundo, CA (US)

(72) Inventor: Paul Chen, Huntington Beach, CA (US)

(73) Assignee: Mattel, Inc., El Segundo, CA (US)

( * ) Notice: Subject to any disclaimer, the term of this patent is extended or adjusted under 35 U.S.C. 154(b) by 543 days.

(21) Appl. No.: 17/132,104

(22) Filed: Dec. 23, 2020

(65) Prior Publication Data

US 2021/0209506 A1 Jul. 8, 2021

Related U.S. Application Data

(60) Provisional application No. 62/956,352, filed on Jan. 2, 2020.

(51) Int. Cl.
| | |
|---|---|
| *A63F 3/00* | (2006.01) |
| *G06N 20/00* | (2019.01) |
| *G06N 3/08* | (2023.01) |
| *A63F 9/24* | (2006.01) |
| *G06F 18/00* | (2023.01) |
| *G06V 10/82* | (2022.01) |

(52) U.S. Cl.
CPC ............ *A63F 3/00643* (2013.01); *A63F 9/24* (2013.01); *G06F 18/00* (2023.01); *G06N 3/08* (2013.01); *G06N 20/00* (2019.01); *G06V 10/82* (2022.01)

(58) Field of Classification Search
CPC .................. A63F 3/00643; A63F 9/24; A63F 2009/2489; G06F 18/00; G06F 18/24133; G06N 3/08; G06N 20/00; G06N 3/045; G06V 10/82
See application file for complete search history.

(56) References Cited

U.S. PATENT DOCUMENTS

| | | | |
|---|---|---|---|
| 10,353,526 B1 * | 7/2019 | Sample ................... | G06F 3/044 |
| 2007/0007973 A1 * | 1/2007 | Matthiessen ......... | A61B 5/0536 |
| | | | 324/692 |
| 2007/0010758 A1 * | 1/2007 | Matthiessen ........ | H03F 3/45475 |
| | | | 600/425 |
| 2009/0018432 A1 * | 1/2009 | He ..................... | G01R 33/4808 |
| | | | 600/409 |
| 2012/0300995 A1 * | 11/2012 | Chen ........................ | G06T 7/60 |
| | | | 382/128 |
| 2013/0013239 A1 * | 1/2013 | Ross .................... | A61B 5/7228 |
| | | | 702/66 |

(Continued)

OTHER PUBLICATIONS

Electrical resistivity tomography—Wikipedia, https://en.wikipedia.org/wiki/Electrical_resistivity_tomography, Mar. 22, 2021, 3 pages.

(Continued)

*Primary Examiner* — Lewis G West
(74) *Attorney, Agent, or Firm* — Edell, Shapiro & Finnan, LLC

(57) ABSTRACT

Improved techniques for identifying objects, such as toy objects, are presented herein. In particular, a play system (e.g., game, doll playset, track set, etc.) includes a probed surface for use in obtaining electrical tomography measurements when toy objects are placed on the probed surface. The play system is configured to analyze the electrical tomography measurements to determine an identity of the toy object placed on the probed surface.

20 Claims, 8 Drawing Sheets

(56) References Cited

U.S. PATENT DOCUMENTS

| | | | |
|---|---|---|---|
| 2013/0033419 A1* | 2/2013 | Dror | G06T 7/12 |
| | | | 382/128 |
| 2013/0155211 A1* | 6/2013 | Tseng | G06F 3/03 |
| | | | 348/61 |
| 2016/0198954 A1* | 7/2016 | Wang | A61B 5/0095 |
| | | | 600/407 |
| 2017/0329289 A1* | 11/2017 | Kohn | F24F 11/46 |
| 2018/0042582 A1* | 2/2018 | Pringle | G01N 27/624 |
| 2018/0330205 A1* | 11/2018 | Wu | G06N 3/02 |
| 2018/0360379 A1* | 12/2018 | Harrison | A61B 5/681 |
| 2019/0328267 A1* | 10/2019 | Cargol | A61B 5/0536 |
| 2020/0124558 A1* | 4/2020 | Cargol | G01N 27/02 |
| 2020/0300795 A1* | 9/2020 | Laakkonen | G01N 33/2847 |
| 2021/0158525 A1* | 5/2021 | Iwase | G06T 7/97 |
| 2021/0183019 A1* | 6/2021 | Uchida | G06N 3/045 |
| 2021/0272233 A1* | 9/2021 | Kondor | G06F 18/214 |
| 2021/0304363 A1* | 9/2021 | Makihira | G16H 50/70 |
| 2021/0373707 A1* | 12/2021 | Harrison | G06F 3/0445 |
| 2023/0081541 A1* | 3/2023 | Grayson | A61B 5/0536 |
| | | | 382/131 |
| 2023/0099024 A1* | 3/2023 | Freeman | A61B 5/055 |
| | | | 604/6.14 |
| 2023/0138492 A1* | 5/2023 | Laske | A61B 5/367 |
| | | | 600/424 |
| 2023/0172559 A1* | 6/2023 | Zheng | A61B 5/0536 |
| | | | 702/19 |
| 2023/0176161 A1* | 6/2023 | Gunnarsson | H04W 64/00 |
| | | | 455/456.1 |

OTHER PUBLICATIONS

M.S. Mat-Shayuti, et al., Development of Low-Cost Non-Obtrusive Electrical Impedance Tomography Device for Liquid-Gas Flow Visualization, International Journal of Electrical and Electronic Engineering & Telecommunications vol. 8, No. 2, Mar. 2019, 8 pages.

Pulkit Sharma, A Comprehensive Tutorial to learn Convolutional Neural Networks from Scratch (deeplearning.ai Course #4), CNN Tutorial, Dec. 26, 2018, 53 pages.

Electrical impedance tomography—Wikipedia, https://en.wikipedia.org/wiki/Electrical_impedance_tomography, Mar. 22, 2021, 14 pages.

Bulsink, B., "NFC Game Board, Mechanics," retrieved from http://nfcgameboard.com/mechanics, Sep. 22, 2023, 7 pages.

Zhang, Y. et al., "Electrick: Low-Cost Touch Sensing Using Electric Field Tomography", CHI '17: Proceedings of the 2017 CHI Conference on Human Factors in Computing Systems, May 2017, pp. 1-14.

Electrick: Low-Cost Touch Sensing Using Electric Field Tomography, YouTube, https://www.youtube.com/watch?v=38h4-5FDdV4, May 8, 2017, 18 pages (YouTube auto-generated transcript of video at pp. 6-14).

* cited by examiner

Numbers of probe measurement
$(n+k+m+j)(n+k+m+j-1)(n+k+m+j-2)/2$

[] = read

ELECTRICAL TOMOGRAPHY-BASED OBJECT RECOGNITION

PRIORITY CLAIM

This application claims the benefit of priority under 35 U.S.C. § 119 to U.S. Provisional Application No. 62/956,352, filed Jan. 2, 2020, the entirety of which is incorporated herein by reference.

FIELD OF THE INVENTION

The present invention relates to electrical tomography for object recognition.

BACKGROUND OF THE INVENTION

Games, toys, play structures, and other similar entertainment systems (collectively and generally referred to herein as "toy objects") are well known for providing play and interaction among children and adults. Increasingly, there is a desire to enhance the play value of toy objects through the use of interactive features. That is, interactive play features may be included in a toy object (or related system) to enhance the stimulation aspects of the toy object.

Various approaches have been proposed for activation of the interactive features of a toy object. However, many of these approaches are either too expensive to implement at a large scale and/or only enable limited functionalities.

SUMMARY OF THE INVENTION

Improved techniques for identifying objects, such as toy objects, are presented herein. In particular, a play system (e.g., game, doll playset, track set, etc.) includes a probed surface for use in obtaining electrical tomography measurements when toy objects are placed on the probed surface. The play system is configured to analyze the electrical tomography measurements to determine an identity of the toy object placed on the probed surface. A number of different play systems could benefit from, and leverage, the knowledge of an identity of a toy object. For example, the identity of a toy object may be used to, for example, initiate one or more interactive features of the play system, the toy object, and/or of a related system.

BRIEF DESCRIPTION OF THE DRAWINGS

Like reference numerals have been used to identify like elements throughout this disclosure.

DETAILED DESCRIPTION OF THE INVENTION

Presented herein are techniques that use electrical tomography to identify (i.e., determine the identity of) objects through the use of a probed surface and machine learning techniques. The determined identity of an object, such as a toy object, may be used to, for example, activate one or more interactive features of a system, the object, and/or a related system.

Merely for ease of description, the techniques presented herein are primarily described with reference to a play system that uses electrical tomography and machine learning to identify toy objects. However, it is to be appreciated that the specific reference to toy object and play systems is illustrative and that the techniques presented herein may be used to identify any of a number of different objects in a variety of different systems.

Figure 1A:
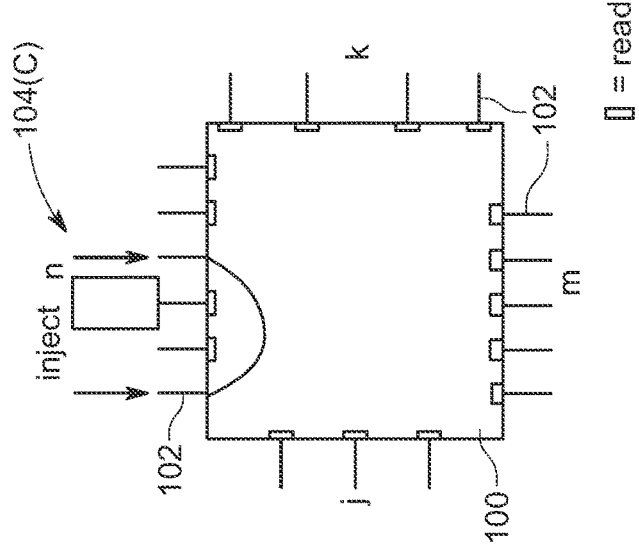
FIGS. 1A, 1B, and 1C are schematic diagrams illustrating a probed surface, in accordance with embodiments presented herein.
Figure 1B:
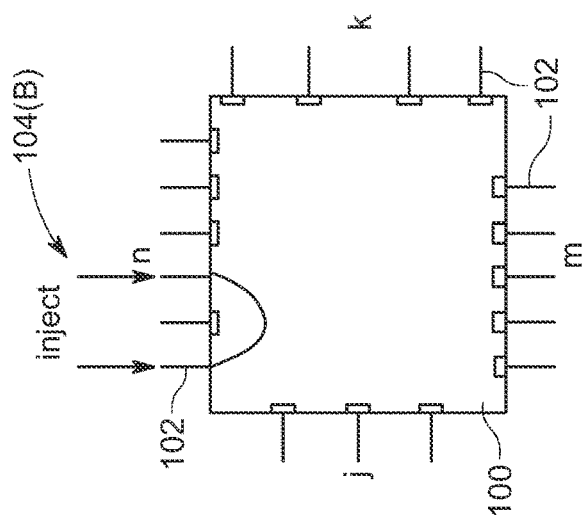
Figure 1C:
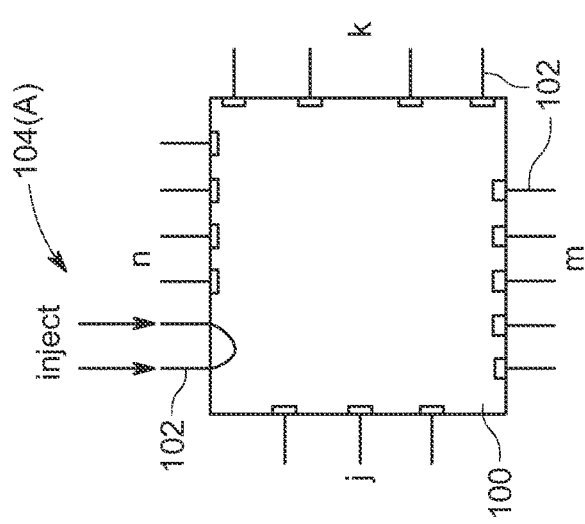

Referring first to FIGS. 1A, 1B, and 1C, shown are three schematic views of a probed surface 100 of a play system in accordance with embodiments presented herein. In operation, when a toy object is placed on the probed surface 100 shown in FIGS. 1A-1C, the probed surface is used by the play system to perform a plurality of electrical tomography measurements. As used herein, electrical tomography generally refers to a process in which a measurement area (e.g., volume or surface) is at least partially surrounded by a plurality of electrodes. Initially, electrical test signals (current signals) are injected/delivered between two electrodes in proximity to the measurement area (probed surface). While the electrical test signals are being delivered, other ones of the plurality of electrodes in proximity to the measurement area capture probe signals (electrical potential measurements) resulting from the delivery of the test signals. This process is then repeated many times while using different combinations of the plurality of electrodes to deliver the electrical test signals and to capture the probe signals.

More specifically, referring to FIGS. 1A-1C, the probed surface 100 is formed from, or coated by, a conductive material. The probed surface 100 is also surrounded by a plurality of electrodes/probes (e.g., input/output (IO) lines) 102 each configured to deliver electrical signals to, or measure/capture electrical signals from, the probed surface 100. In the example of FIG. 1A, when a toy object (not shown in FIGS. 1A-1C) is placed on the probed surface 100, a first pair 104(A) of the plurality of electrodes 102 is used to deliver electrical test signals to the probed surface 100. While the electrical test signals are delivered via the first electrode pair 104(A), the other electrodes in the plurality of electrodes 102 (i.e. the electrodes not being used to deliver the electrical test signals) are used to capture probe signals from the probed surface. The probe signals captured at the other electrodes in the plurality of electrodes 102, which are sometimes referred to herein as an "electrical tomography measurement" are then stored for subsequent analysis.

The delivery of the electrical test signals via the first electrode pair 104(A) is terminated. Thereafter, as shown in FIG. 1B, a second pair 104(B) of the plurality of electrodes 102 is used to deliver electrical test signals to the probed surface 100. While the electrical test signals are delivered via the second electrode pair 104(B), the other electrodes in the plurality of electrodes 102 are used to capture probe signals (i.e., capture a second electrical tomography measurement), which are then stored for subsequent analysis. The delivery of the electrical test signals via the second electrode pair 104(B) is terminated and, as shown in FIG. 1C, a third pair 104(C) of the plurality of electrodes 102 is used to deliver electrical test signals to the probed surface 100. While the electrical test signals are delivered via third electrode pair 104(C), the other of the plurality of electrodes 102 are used to capture probe signals (i.e., capture a third electrical tomography measurement), which are then stored for subsequent analysis.

FIGS. 1A-1C merely illustrate the process of delivery of electrical test signals and the capture of probe signals for three different electrode pairs along a first edge of the probed surface 100 (i.e., capture of three electrical tomography measurements). It is to be appreciated that the process shown in FIGS. 1A-1C may be repeated for all of the remaining electrode pairs provided in the plurality electrode 102, or for only a subset of the electrode pairs provided in the plurality electrode 102. However, in general, the result is that multiple electrical tomography measurements are captured and stored for subsequent analysis.

In a traditional grid structure, only $n*m+j*k$ measurements are made per type. However, in one example electrical tomography approach, the number of measurements made is on a $3^{rd}$ order magnitude, as shown in FIGS. 1A-1C (i.e., an electrical tomography process generally makes more measurements per active probes than a traditional grid structure) and may be represented as follows: Number of Probe Measurements=$(n+k+m+j)(n+k+m+j-1)(n+k+m+j-2)/2$.

It is to be appreciated that, merely for ease of illustration, the probed surface 100 of FIGS. 1A-1C is shown surrounded by a small number of the electrodes/probes. In practice, a larger number of probes may surround a probed surface in accordance with embodiments presented herein as the larger number of probes provides for more granularity in the probe signal sets. It also to be appreciated that the numbers and placement of the electrodes may be selected/optimized based, for example, on the requirements of the play system, a training set of objects, etc.

Figure 2:
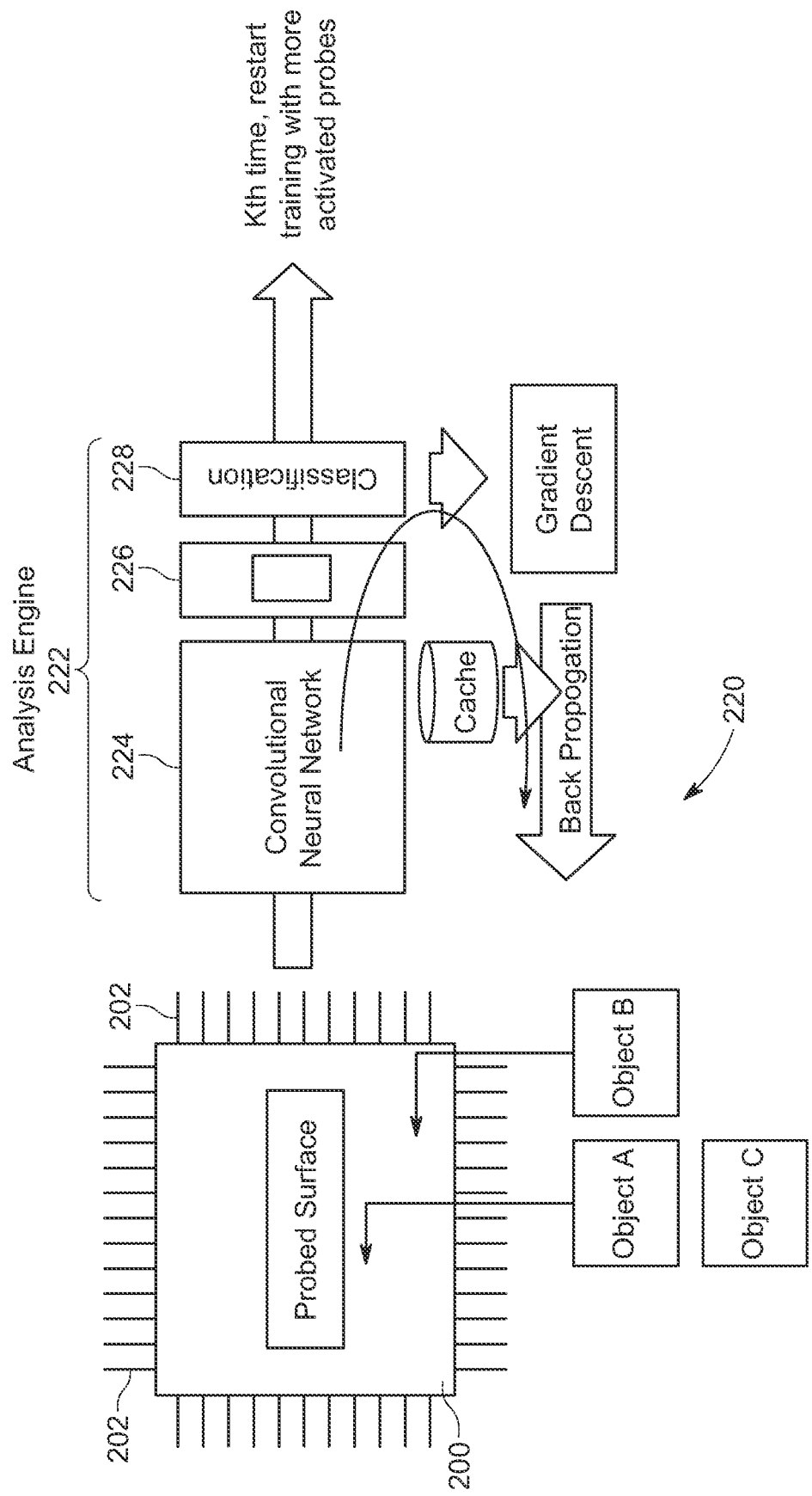
FIG. 2 is functional block diagram of a play system, in accordance with certain embodiments presented herein.

FIG. 2 is functional block diagram of a play system 220, in accordance with certain embodiments presented herein. As shown, the play system 220 includes a probed surface 200 formed from, or coated by, a conductive material. The probed surface 200 is also surrounded by a plurality of electrodes/probes (e.g., input/output (IO) lines) 202 each configured to deliver electrical signals to, or measure/capture electrical signals from, the probed surface 200, for performance of electrical tomography measurements.

In the example of FIG. 2, the play system 220 also includes an analysis engine 222, which in this example comprises a convolutional neural network (CNN) module 224, a multi-class probability module 226 (e.g., Softmax), and a classification module 228. In practice, the analysis engine 222 may be implemented by one or more processors executing instructions (e.g., software, firmware, logic, etc.) stored in one or more memory devices (memory). The one or more processors may comprise, for example, one or more hardware processors, such as Digital Signal Processors (DSPs), one or more microprocessor (uC) cores, etc., partially or fully implemented in, for example, one or more application-specific integrated circuits (ASICs), etc.

As noted, the analysis engine 222 comprises CNN module 224, multi-class probability module 226, and classification module 228. It is to be appreciated that this specific arrangement for the analysis engine 222 is illustrative and that an analysis engine in accordance with embodiments presented herein may have other arrangements. For example, in one alternative embodiment, CNN module 224 could be replaced or supplemented by a different type of machine learning (ML) process, including a different neural network, artificial intelligence (AI) sub-system, etc.

For ease of illustration, FIG. 2 generally represents two phases/stages of the play system 220, in accordance with embodiments. These two phases include an initial "training" phase and a "real-time" or "use" phase. During the training phase, the analysis engine 222 is trained/taught to determine the identity of toy objects placed on the probed surface 200. That is, the analysis engine 222 is taught to recognize the electrical signature (in terms of multiple electrical tomography measurements) of specific toy objects. The training phase may be performed, for example, during the design and testing of the play system 220.

In contrast, during the real-time phase, the analysis engine 222 is configured to produce a determination of the identity of a toy object placed on the probed surface 200. The real-time phase represents use of the play system 220 by a consumer, where the identity of a toy object placed on the probed surface 200 may be used to initiate a subsequent action (e.g., initiate an interactive feature of the play system, the toy object, etc.).

Referring first to the training phase, in the example of FIG. 2 an "Object A," an "Object B," and an "Object C" are placed on the probed surface 200 and two-probe tomography readings (e.g., as shown in each of FIGS. 1A-1C) are taken to create a training set of multiple electrical tomography measurements for use by the analysis engine 222 (e.g., CNN module 224) based on a first set of active probes 202. In certain examples, the first set of active probes 202 are chosen as being active based on detection of an object touch. The analysis engine 222, using e.g., gradient descent and back propagation, attempts to obtain a positive classification after k rounds of training. If no positive classification reached after k rounds, then the play system 220 automatically adds more active probes and training is restarted. The cycle is repeated until the object recognition is accurate with the minimum number of probes.

As noted above, the training phase performed, for example, during the design and testing of the play system 220. Once the training phase is completed, the play system 220 is able to perform real-time identification of toy objects placed on the probed surface 200. It is to be appreciated that the training phase may not be performed for each manufactured play system implementing the embodiments presented herein. Instead, the result of the training phase may be software/firmware instructions that, when loaded into the play system 220, or a similarly structured play system, to perform real-time identification of toy objects.

Figure 3:
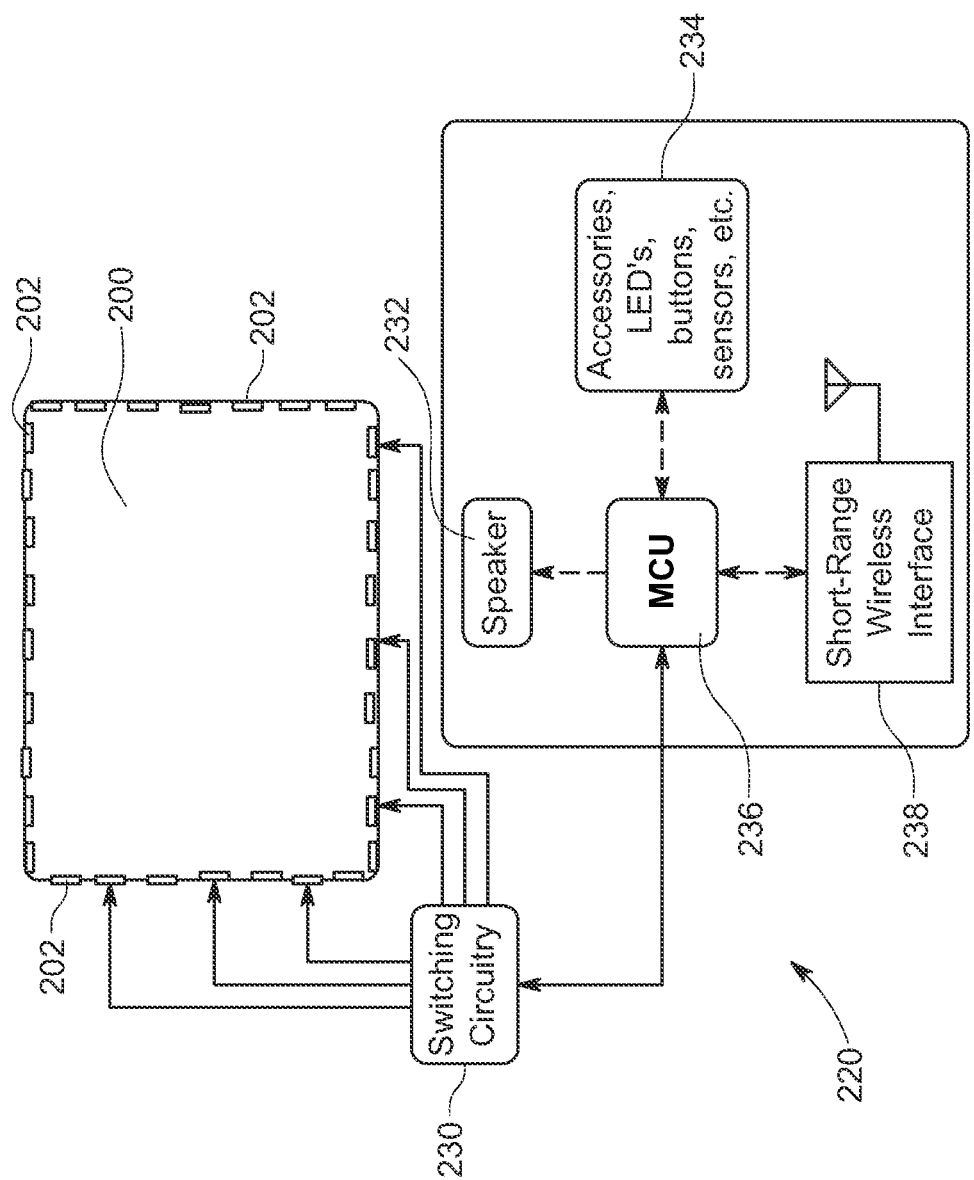
FIG. 3 is another block diagram of the play system of FIG. 2, in accordance with certain embodiments presented herein.

FIG. 3 is another block diagram of the play system 220, in accordance with certain embodiments presented herein. As noted, the play system 220 includes the probed surface 200 at least partially surrounded by the plurality of electrodes/probes (e.g., input/output (IO) lines) 202 each configured to deliver electrical signals to, or measure/capture electrical signals from, the probed surface 200, for performance of electrical tomography measurements. Each of the plurality of electrodes 202 are connected to switching circuitry 230, which enables the selective delivery of electrical signals to, or the capture of electrical potentials from, each of the plurality of electrodes 202. Merely for ease of illustration, only a subset of the electrodes 202 are shown connected to the switching circuitry 230.

The play system 220 also includes a microcontroller (MCU) 236 that is configured to, for example, perform the operations described above with reference to analysis engine 222. That is, the microcontroller 236 includes one or more CPUs (processor cores), memory, and programmable input/output peripherals configured to, for example, implement the features of a convolutional neural network (CNN) module, a multi-class probability module, and a classification module, as described above. The microcontroller 236 is connected to the switching circuitry 230 and is configured to active the switching circuitry 230 so as to selectively deliver electrical signals to, or capture electrical potentials from, the various electrodes 202. As referred to herein, any of memory, storage, a cache, etc. may include one or more non-transitory computer-readable storage media.

The example play system 220 also comprises a speaker 232, one or more accessories 234 (e.g., Light Emitting Diodes (LEDs), buttons, sensors, etc.), and a short-range wireless interface 238. The short-range wireless interface 238 may be, for example, a Bluetooth® interface. Bluetooth is a registered trademark of the Bluetooth Special Interest Group (SIG).

In real-time use, a toy object (not shown in FIG. 3) can be placed on the probed surface 200. When the toy object is placed on the probed surface 200, the microcontroller 236 is configured to perform a plurality of electrical tomography measurements at the probed surface 200 (e.g., by selectively activating combinations of the electrodes 202 via switching circuitry 230). The microcontroller 236 collects, stores, and then analyzes the plurality of electrical tomography measurements (e.g., by executing the analysis engine 222) to determine the identity (e.g., identify) the toy object placed on the probed surface 200.

In accordance with embodiments presented herein, the "identity" of the toy object, placed on the probed surface 200, as determined by the play system 220, may take different forms. In certain embodiments, the identity of the toy object, as determined by the play system 220, is a general categorization of the toy object (e.g., "toy vehicle," "doll," etc.). In further embodiments, the identity of the toy object, as determined by the play system 220, is a specific categorization of the toy object (e.g., "toy car," "toy truck," etc.). In other embodiments, the identity of the toy object, as determined by the play system 220, includes a specific identification of the toy (e.g., in terms of a specific model number). It is to be appreciated that these types of identifications are merely illustrative that the different identifications of toy objects are within the scope of the embodiments presented herein.

As noted above, a toy object placed on the probed surface 200 is identified by the play system 220, namely the analysis engine 222, based on a plurality of electrical tomography measurements. In general, each toy object (e.g., each general category of objects, each specific category of objects, each specific object, etc.) may result in a specific pattern of electrical tomography measurements. This specific pattern of electrical tomography measurements is sometimes referred to herein as the "electrical signature" of the toy object. As such, the analysis engine 222 is configured to analyze the electrical signature (as represented in the plurality of electrical tomography measurements) of the toy object and determine the identity of the toy object based on that electrical signature. The electrical signature of a given toy object may be controlled by, for example, the shape of the portion of the toy object in contact with the probed surface 200, the material properties of the portion of the toy object in contact with the probed surface 200, etc.

Discussed above were techniques for training an analysis engine to determine the identity of toy objects placed on a probed surface. In certain aspects, the probed surface is referred to as an "over-probed" surface that includes a number electrodes/probes, but only a subset of those electrodes are needed to perform a given electrical tomography measurement. Accordingly, certain embodiments presented herein include determination of the optimal (e.g., minimal) number of the total electrodes that need to be used to perform an electrical tomography measurement that is sufficient to accurately identify toy objects (i.e., determine which subset of the total electrodes need to be used to perform an electrical tomography measurement).

In general, the techniques to determine the optimal number electrodes for use in performing an electrical tomography measurement start from a minimal number and advance to a number that is effective enough to detect the identity of the object. At the outset, the number of readings (e.g., at 8×8 or 16×16) may not need any convolutional reduction at all. Instead, the techniques may rely upon pooling and/or direct connection to the neural network (e.g., the convolutional weights are a pass through). However, if the surface area is large or objects are small, it is feasible that the measurements taken may scale drastically.

For example, when a flat dimensional probed surface is provided in which n=m and j=k, electrical tomography, depending on implementation, can quickly get to very high levels, as shown below in Table 1.

TABLE 1

| n | j | Number of Electrical Tomography Readings |
|---|---|---|
| 64 | 32 | 428,640 |
| 128 | 64 | 3,483,840 |
| 160 | 80 | 6,825,840 |
| 256 | 128 | 28,090,752 |
| 480 | 320 | 255,040,800 |
| 640 | 480 | 700,583,520 |
| 1280 | 720 | 3,994,002,000 |
| 1920 | 1080 | 13,486,503,000 |

Table 1 illustrates that a probe set of only 160 by 80 can reach up to the 6 million readings. Given the large number of readings, a convolutional approach may be needed, although around a 64 by 32 set is approximately the level at which convolutional filters may not be needed.

It is also to be appreciated that the standard convolutional filters defined today were originally based on image recognition properties (e.g., edge detection) and, although convolution filter sets have evolved, they are typically optimized based on a grid pattern. However, in the electrical tomography techniques presented herein, there are $n^2+j^2$ readings that are in crossing patterns, not in a grid fashion. Accordingly, since the techniques presented may be used with large surfaces and/or small objects, and the size of the convolutional filters is defined, the techniques presented herein may also include a new and innovative set of convolutional filters that have both grid and crossing pattern utilization.

Figure 4:
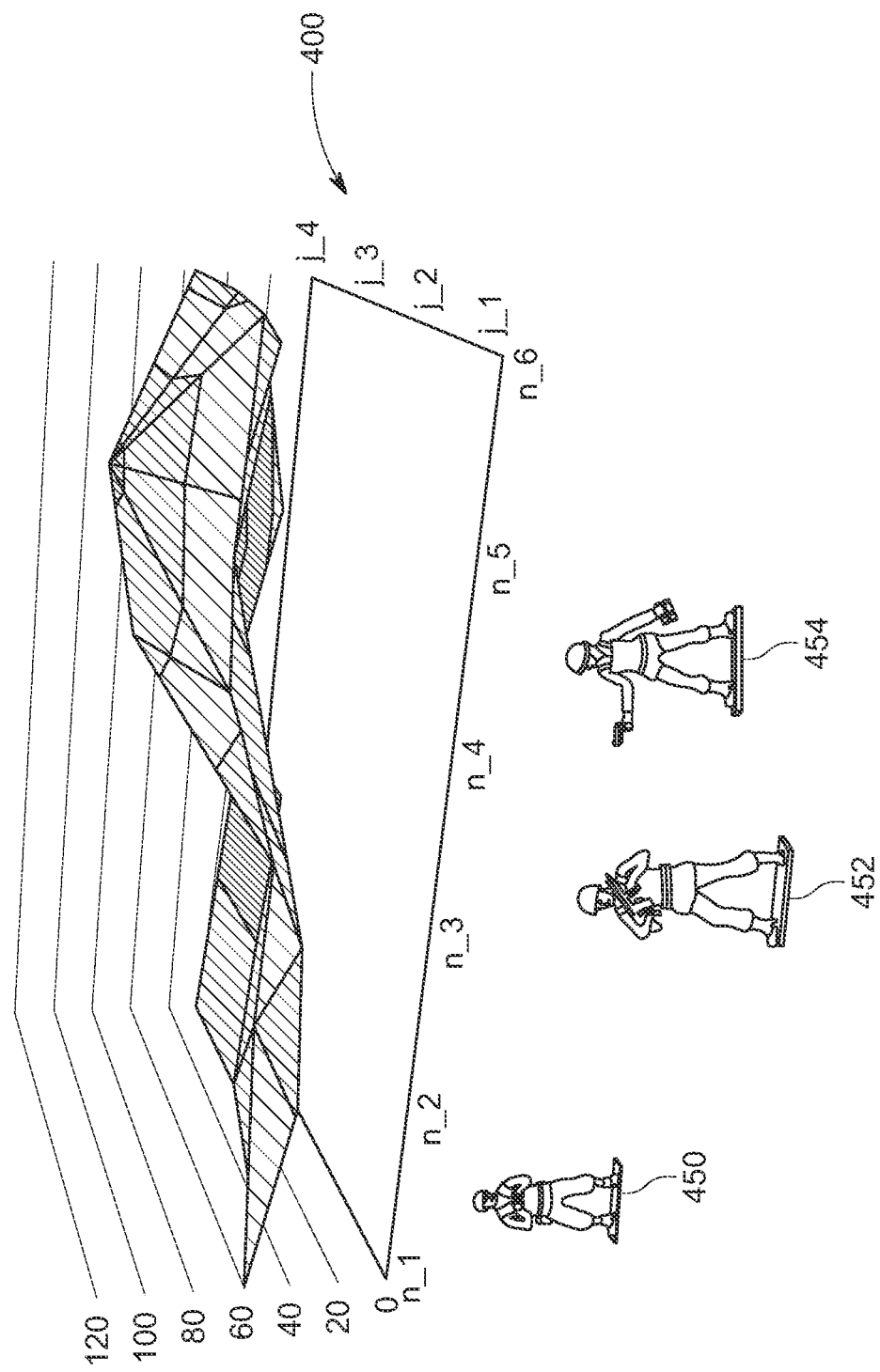
FIG. 4 is a multidimensional representation of a probed surface and toy objects for placement on the probed surface, in accordance with certain embodiments presented herein.
Figure 5:
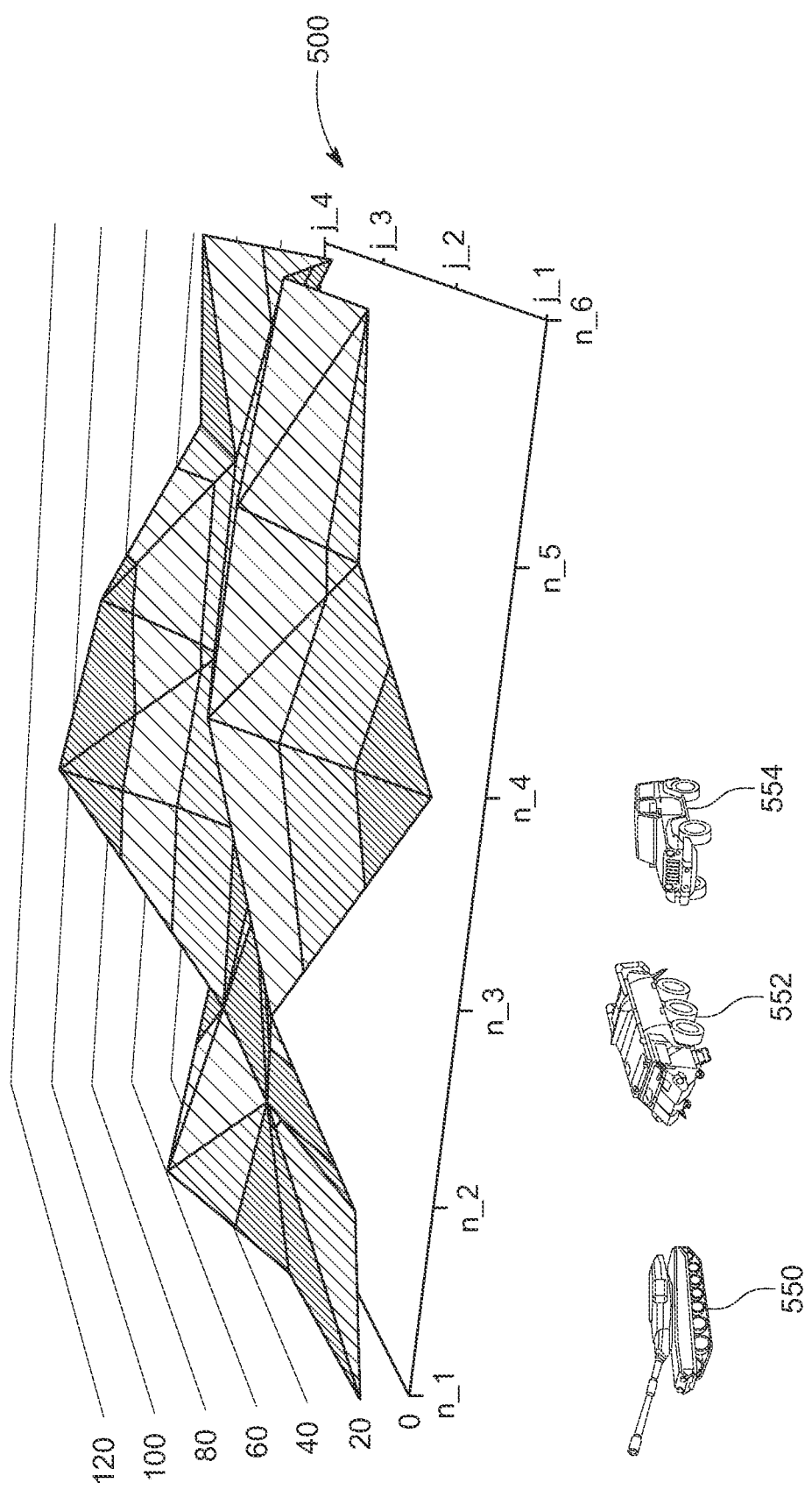
FIG. 5 is a multidimensional representation of a probed surface and toy objects for placement on the probed surface, in accordance with certain embodiments presented herein.

As an example, it is assumed that an optimization process has been performed for a probed game surface (probed surface) 400 and objects 450, 452, and 454, each schematically presented in FIG. 4. Associated weights determined for objects 450, 452, and 454 can be the starting point for a new probed game surface 500, objects 550, 552, and 554, and probe distribution, as shown in FIG. 5.

As noted above with reference to FIGS. 2 and 3, the electrical signature of a toy object may be controlled by, for example, the shape of the portion of the toy object in contact with the probed surface 200, the material properties of the portion of the toy object in contact with the probed surface 200, etc. In certain embodiments, it may be possible to modify a toy object in order to illicit specific electrical signatures or specific electrical signature characteristics/ attributes. For example, in one embodiment an invisible stamp that can be applied to a surface of a toy object so that the toy object will disrupt the electrical tomography measurements in a known way or pattern. Additionally, if a play system/game play system utilizes general identification (i.e., object classification/categorization), rather than specific/ absolute identification, then a die cast bottom of a normal toy vehicle should uniquely provide electrical signatures that allow the system distinguish, to some degree, a vehicle based on the metallic stamping.

The above embodiments have generally been described with reference to probes/electrodes on the outer edge of a probed surface. However, in some embodiments, play systems may include non-planar surfaces where it may be beneficial to have electrodes placed on the surface itself, rather than only at the outer edges.

Figure 6:
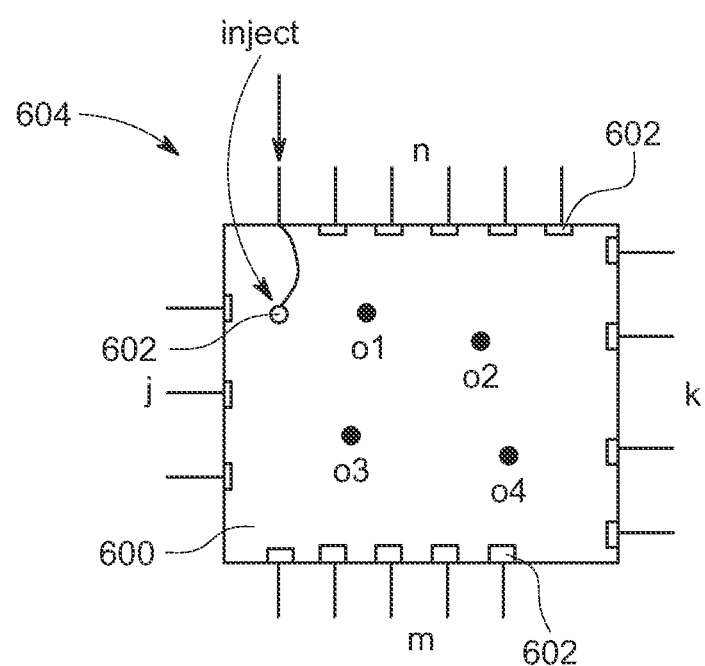
FIG. 6 is a schematic diagram illustrating a probed surface, in accordance with embodiments presented herein.

For example, FIG. 6 illustrates an example probed surface 600 that includes electrodes/probes 602 placed both at the outer edge of the probed surface, as well as electrodes/ probes placed/disposed on top of (i.e., on the body of) the probed surface 600. FIG. 6 also illustrates that electrical test signals can be delivered/injected between an electrode at the outer edge and an electrode on the surface itself. That is, FIG. 6 illustrates an electrode pair 604 formed by an electrode at the outer edge and an electrode on the surface itself.

Figure 7:
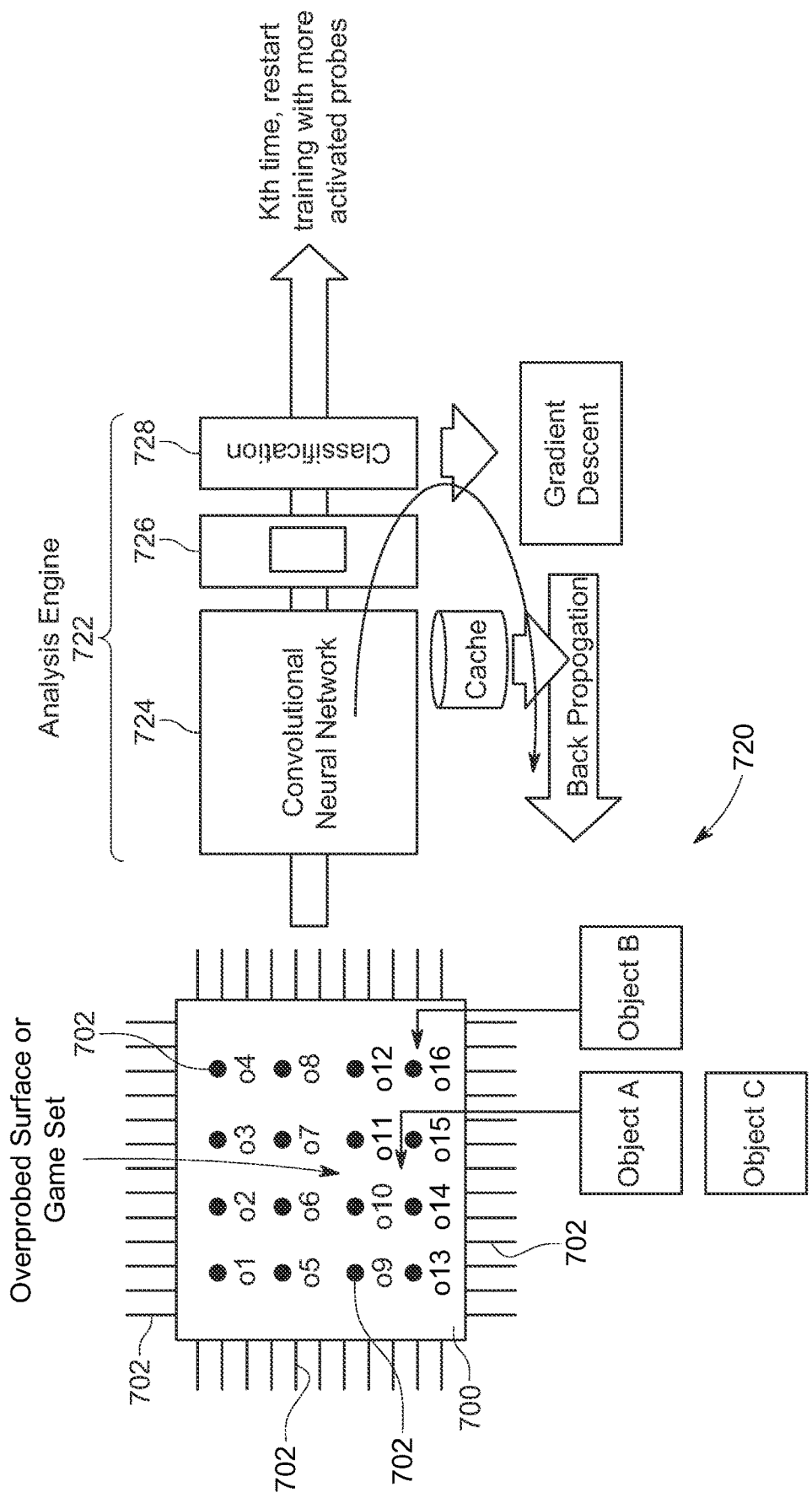
FIG. 7 is functional block diagram of a play system, in accordance with certain embodiments presented herein.

FIG. 7 is functional block diagram of a play system 720 that includes a probed surface 700 that is similar to that shown in FIG. 6. That is, the probed surface 700 is formed from, or coated by, a conductive material and a plurality of electrodes/probes (e.g., input/output (IO) lines) 702 are disposed at the outer edges of the probed surface. In addition, additional electrodes/probes 702 are disposed on top of (i.e., on the body of) the probed surface 700. The electrodes/ probes 702, either disposed at the outer edges or on the top of the probed surface 700, are configured to deliver electrical signals to, or measure/capture electrical signals from, the probed surface 700, for performance of electrical tomography measurements.

In the example of FIG. 7, the play system 720 is similar to play system 220 of FIG. 2, and includes an analysis engine 722, which in this example comprises a convolutional neural network (CNN) module 724, a multi-class probability module 726 (e.g., Softmax), and a classification module 728. In practice, the analysis engine 722 may be implemented by one or more processors executing instructions (e.g., software, firmware, etc.) stored in one or more memory devices (memory). The one or more processors may comprise, for example, one or more hardware processors, such as Digital Signal Processors (DSPs), one or more microprocessor (uC) cores, etc., partially or fully implemented in, for example, one or more application-specific integrated circuits (ASICs), etc.

As noted, the analysis engine 722 comprises CNN module 724, multi-class probability module 726, and classification module 728. It is to be appreciated that this specific arrangement for the analysis engine 722 is illustrative and that an analysis engine in accordance with embodiments presented herein may have other arrangements. For example, in one alternative embodiment, CNN module 724 could be replaced or supplemented by a different type of machine learning (ML) process, including a different neural network, artificial intelligence (AI) sub-system, etc.

Similar to play system 220, play system 720 may undergo a training phase in the analysis engine 722 is trained/taught to determine the identity of toy objects placed on the probed surface 700. That is, the analysis engine 722 is taught to recognize the electrical signatures (in terms of multiple electrical tomography measurements) of specific toy objects. The training phase may be performed, for example, during the design and testing of the play system 720. In addition, the play system 720 may be used for real-time phase determination of the identities of toy objects placed on the probed surface 700. This real-time use of the play system 720 includes use by a consumer, where the identity of a toy object placed on the probed surface 700 may be used to initiate a subsequent action (e.g., initiate an interactive feature of the play system, the toy object, etc.).

Each of the training and real-time operations of the play system 720 may be similar to the training and real-time operations described above with reference to play system 220 of FIG. 2, except that additional electrodes at additional electrodes provide more inputs to the analysis engine 722.

Figure 8:
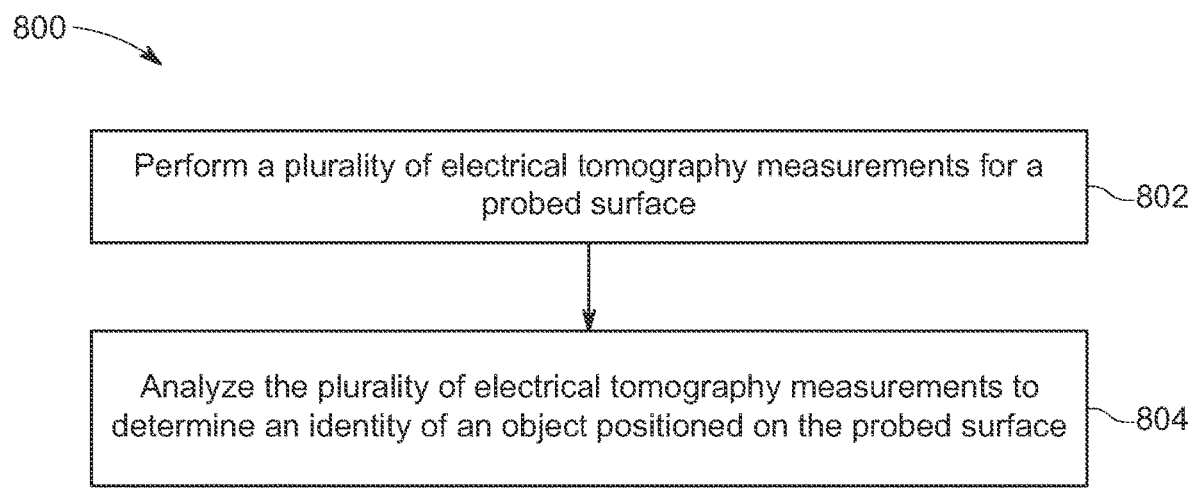
FIG. 8 is a flow chart depicting a method, in accordance with certain embodiments presented herein.

FIG. 8 is a flow chart depicting a method 800, in accordance with certain embodiments presented herein. In at least one embodiment, method 800 may be performed by a hardware processor, such as microcontroller 236 of FIG. 2 that includes one or more CPUs (processor cores), memory, and programmable input/output peripherals configured to, for example, implement the features of a convolutional neural network (CNN) module, a multi-class probability module, and a classification module, as described herein. Further, the microcontroller is connected to the switching circuitry (e.g., switching circuitry 230 of FIG. 2) and is configured to active the switching circuitry so as to selectively deliver electrical signals to and/or capture electrical potentials from various electrodes/probes (e.g., electrodes/ probes 202 of FIG. 2, electrodes/probes 602 of FIG. 6, or electrodes/probes 702 of FIG. 7) that can be configured on an edge of a probed service, on a body of a probed surface, or any combination thereof (e.g., any of probed surface 200 of FIG. 2, probed surface 600 of FIG. 6, or probed surface 700 of FIG. 7).

As shown at 802, the method includes performing a plurality of electrical tomography measurements for a probed surface. Performing the plurality of electrical tomography measurements for the probed surface can include obtaining a plurality of electrical tomography measurements from electrodes/probes of the probed surface based on electrical signals delivered/injected to the electrodes/probes.

The probed surface can include a planar surface or a non-planar surface. In some embodiments, the probed surface can include a plurality of electrical probes configured along one or more outer edges of the probed surface. In some embodiments, the probed surface can include a plurality of electrical probes configured on a body of the probed surface. In still some embodiments, the probed surface can include a plurality of electrical probes configured along one or more edges of the probed surface and a plurality of electrical probes configures on a body of the probed surface. In some embodiments, the probed surface is a play surface of a toy, a play system, or a probed game surface.

As shown at 804, the method includes analyzing the plurality of electrical tomography measurements to determine an identity of an object positioned on the probed surface. In at least one embodiment, the analysis includes determining the identity of the object using a trained machine learning process. In at least one embodiment, trained machine learning process can be a trained Convolutional Neural Network (CNN) process.

In some embodiments, the object can be a toy object. In some embodiments, the identity indicates a category associated with the toy object. In some instances, the category can be a general category (e.g., "toy vehicle," "doll," etc.) associated with the toy object. In some instances, the category can be a specific category (e.g., "toy car," "toy truck," etc.) associated with the toy object. In some embodiments, the identity indicates a specific identification of the toy object (e.g., a specific model number, etc.).

In some embodiments, the analyzing can include identifying a stamp (e.g., an invisible stamp) on a bottom of the toy object that indicates the identity of the toy object such that the stamp is configured to disrupt the plurality of electrical tomography measurements in a known pattern. In some embodiments, the analyzing can include identifying a metallic stamping of a bottom of the toy object that indicates the identity of the toy object.

The techniques presented herein may provide any of a number of advantages over conventional arrangements. For example, the techniques presented herein may facilitate the development of a play system that includes a play surface formed from a low-cost conductive material, with an optimized electrode probe structure that enables electrical tomographic readings and the use of a machine learning (ML) process, e.g., a neural network classifier, to determine the identity of small objects (e.g., the size of a toy or game piece). Furthermore, the use of printable electronics technology may be employed to obtain reliable and repeatable electrode patterns on the play surface during manufacturing, utilize low-cost ARM processors to run the classifier, and/or apply the electrode patterns to any arbitrary surface. As noted, it is possible to use a machine learning training structure to find the minimum number of electrodes and electrode pattern needed to uniquely identify an object based on size of detection surface, conductive material used, and optimized sample population of objects. The techniques presented herein also contemplate a method of increasing readings by not just measuring constant electrical probe techniques, but also inject a frequency base electrical probe. Moreover, the techniques presented herein may facilitate the addition of new objects to the machine learning classification system that were not included in the original sample population, with minimal re-training and without loss of existing object identification.

In one form, a method is provided that includes performing a plurality of electrical tomography measurements for a probed surface; and analyzing the plurality of electrical tomography measurements to determine an identity of an object positioned on the probed surface.

In one form, one or more non-transitory computer readable storage media encoded with software comprising computer executable instructions is provided that, when executed by a processor, cause the processor to perform operations, comprising performing a plurality of electrical tomography measurements for a probed surface; and analyzing the plurality of electrical tomography measurements to determine an identity of an object positioned on the probed surface.

In one form, an apparatus is provided that includes a probed surface; a memory; and at least one processor coupled to the probed surface and the memory, wherein the processor is configured to: obtain a plurality of electrical tomography measurements from the probed surface, and analyze the plurality of electrical tomography measurements to determine an identity of an object positioned on the probed surface.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory, storage, a cache, or the like can store data, software, code, instructions (e.g., processor instructions), logic, parameters, combinations thereof, and/or the like used for operations described herein. This includes memory and/or any other storage/cache being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, a play system as described herein, may include hardware, firmware, and/or software embodied on a tangible medium. A tangible medium may be substantially any computer-readable medium that is capable of storing logic or computer program code that may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

What is claimed is:

1. A method, comprising:
performing a plurality of electrical tomography measurements for a play surface of a toy; and
analyzing the plurality of electrical tomography measurements to determine an identity of a toy object positioned on the play surface of the toy, wherein the analyzing includes identifying one of:
a stamp on a bottom of the toy object that indicates the identity of the toy object, wherein the stamp is configured to disrupt the plurality of electrical tomography measurements in a known pattern; or
a metallic stamping of a bottom of the toy object that indicates the identity of the toy object.

2. The method of claim 1, wherein the identity of the toy object is determined utilizing a trained machine learning process.

3. The method of claim 2, wherein the trained machine learning process is associated with a Convolutional Neural Network.

4. The method of claim 1, wherein the play surface of the toy is a non-planar play surface of the toy.

5. The method of claim 1, wherein the play surface of the toy comprises a plurality of electrical probes configured along one or more outer edges of the play surface of the toy.

6. The method of claim 1, wherein the play surface of the toy comprises a plurality of electrical probes configured on a body of the play surface of the toy.

7. The method of claim 1, wherein the identity indicates a category associated with the toy object.

8. The method of claim 1, wherein the identity indicates a model number associated with the toy object.

9. One or more non-transitory computer readable storage media encoded with software comprising computer executable instructions that, when executed by a processor, cause the processor to perform operations, comprising:
performing a plurality of electrical tomography measurements for a play surface of a toy; and
analyzing the plurality of electrical tomography measurements to determine an identity of a toy object positioned on the play surface of the toy, wherein the analyzing includes identifying one of:
a stamp on a bottom of the toy object that indicates the identity of the toy object, wherein the stamp is configured to disrupt the plurality of electrical tomography measurements in a known pattern; or
a metallic stamping of a bottom of the toy object that indicates the identity of the toy object.

10. The media of claim 9, wherein the identity of the toy object is determined utilizing a trained machine learning process.

11. The media of claim 10, wherein the trained machine learning process is associated with a Convolutional Neural Network.

12. The media of claim 9, wherein the identity indicates a category associated with the toy object.

13. The media of claim 9, wherein the identity indicates a model number associated with the toy object.

14. A toy, comprising:
a play surface;
a memory; and
at least one processor coupled to the play surface and the memory, wherein the processor is configured to:
obtain a plurality of electrical tomography measurements from the play surface, and
analyze the plurality of electrical tomography measurements to determine an identity of a toy object positioned on the play surface, wherein the analyzing includes identifying one of:
a stamp on a bottom of the toy object that indicates the identity of the toy object, wherein the stamp is configured to disrupt the plurality of electrical tomography measurements in a known pattern; or
a metallic stamping of a bottom of the toy object that indicates the identity of the toy object.

15. The toy of claim 14, wherein the play surface comprises a plurality of electrical probes configured along an outer edge of the play surface.

16. The toy of claim 14, wherein the play surface comprises a plurality of electrical probes configured on a body of the play surface.

17. The toy of claim 14, wherein the play surface is a non-planar play surface.

18. The toy of claim 14, wherein the play surface comprises a plurality of electrical probes configured along one or more outer edges of the play surface.

19. The toy of claim 14, wherein the identity indicates a category associated with the toy object.

20. The toy of claim 14, wherein the identity indicates a model number associated with the toy object.

* * * * *